United States Patent
Park et al.

(10) Patent No.: US 8,752,682 B2
(45) Date of Patent: Jun. 17, 2014

(54) PISTON ASSEMBLY OF SHOCK ABSORBER

(75) Inventors: Wan Sang Park, Jeollabuk-do (KR); Jun Sik Shin, Jeollabuk-do (KR)

(73) Assignee: Mando Corporation, Gyeonggi-Do (KR)

( * ) Notice: Subject to any disclaimer, the term of this patent is extended or adjusted under 35 U.S.C. 154(b) by 5 days.

(21) Appl. No.: 13/473,406

(22) Filed: May 16, 2012

(65) Prior Publication Data

US 2013/0037361 A1 Feb. 14, 2013

(30) Foreign Application Priority Data

Aug. 11, 2011 (KR) .................. 10-2011-0079963

(51) Int. Cl.
*F16F 9/00* (2006.01)
(52) U.S. Cl.
USPC ............... 188/322.22; 188/322.15; 188/282.6
(58) Field of Classification Search
USPC ......... 188/282.5, 282.6, 322.15, 322.22, 316, 188/283
See application file for complete search history.

(56) References Cited

U.S. PATENT DOCUMENTS

| | | | | |
|---|---|---|---|---|
| 4,830,152 A * | 5/1989 | Rauert et al. | ............. | 188/322.15 |
| 5,259,294 A * | 11/1993 | May | .............. | 92/181 P |
| 6,199,671 B1 * | 3/2001 | Thyssen | .......... | 188/62 |
| 6,460,664 B1 * | 10/2002 | Steed et al. | ............. | 188/322.15 |
| 6,481,336 B2 * | 11/2002 | May | .............. | 92/185 |
| 7,178,237 B2 * | 2/2007 | Casellas et al. | ......... | 29/888.047 |
| 7,584,829 B2 * | 9/2009 | Schmidt | ............ | 188/322.15 |
| 7,628,257 B1 * | 12/2009 | Lu | ............... | 188/282.6 |
| 7,703,586 B2 * | 4/2010 | Deferme | .......... | 188/322.13 |
| 8,157,065 B2 * | 4/2012 | Ashiba | ............ | 188/322.15 |
| 2007/0068753 A1 * | 3/2007 | Schmidt | ............ | 188/322.15 |
| 2009/0000891 A1 * | 1/2009 | Kouyama et al. | ........ | 188/322.15 |
| 2009/0260938 A1 * | 10/2009 | Hikosaka | .......... | 188/322.15 |

FOREIGN PATENT DOCUMENTS

| | | |
|---|---|---|
| JP | 5-30582 | 4/1993 |
| JP | 08-028620 | 2/1996 |
| JP | 08-261268 | 10/1996 |
| JP | 10-073140 | 3/1998 |
| JP | 2007-198515 A | 8/2007 |

OTHER PUBLICATIONS

Japanese Office Action issued in Japanese Patent Application No. JP 2012-114088 dated Jun. 25, 2013.
Chinese Office Action issued in Application No. 201210174877.3 dated Feb. 25, 2014.

* cited by examiner

*Primary Examiner* — Thomas Irvin
(74) *Attorney, Agent, or Firm* — McDermott Will & Emery LLP

(57) ABSTRACT

Provided is a piston assembly of a shock absorber, which is simple in structure and is easy to fabricate. The piston assembly of the shock absorber includes: a piston body in which a piston rod reciprocating within a cylinder penetrates a central portion thereof, and a plurality of compression passages and a plurality of rebound passages alternately penetrating the piston body are formed around the piston rod; a compression retainer placed over the piston body, in which a plurality of connection holes corresponding to the compression passages penetrate the compression retainer; and a rebound retainer placed under the piston body, in which a plurality of connection holes corresponding to the rebound passages penetrate the rebound retainer.

9 Claims, 3 Drawing Sheets

PISTON ASSEMBLY OF SHOCK ABSORBER

CROSS-REFERENCE(S) TO RELATED APPLICATION

This application claims priority of Korean Patent Application No. 10-2011-0079963, filed on Aug. 11, 2011, in the Korean Intellectual Property Office, which is hereby incorporated by reference in its entirety.

BACKGROUND OF THE INVENTION

1. Field of the Invention

The present invention relates to a shock absorber, and more particularly, to a piston assembly of a shock absorber.

2. Description of the Related Art

Generally, a shock absorber is designed to support a weight of a vehicle body and suppress and dampen a vibration transferred from a road surface to the vehicle body, contributing to improving a ride comfort and protecting loaded goods and various parts of a vehicle.

Such a shock absorber includes a cylinder filled with a working fluid (oil), a reciprocating piston rod connected to a vehicle body, and a piston valve connected to a lower end of the piston rod to slide within the cylinder and control a flow of the working fluid.

During a compression stroke of the shock absorber, oil of a compression chamber disposed under the piston valve moves to a rebound chamber through a compression passage formed in the piston valve.

During a rebound stroke of the shock absorber, oil of a rebound chamber disposed over the piston valve moves to a compression chamber through a rebound passage formed in the piston valve to thereby absorb a vibration and shock.

In the piston valve, the use of a sandwich type piston increasing the degree of freedom of tuning has recently been growing.

The sandwich type structure tends to make the inner passage of the piston complicated. Therefore, unit price is increased and the productivity is lowered.

SUMMARY OF THE INVENTION

An aspect of the present invention is directed to a piston assembly of a shock absorber, which is simple in structure and is easy to fabricate.

According to an embodiment of the present invention, a piston assembly of a shock absorber includes: a piston body in which a piston rod reciprocating within a cylinder penetrates a central portion thereof, and a plurality of compression passages and a plurality of rebound passages alternately penetrating the piston body are formed around the piston rod; a compression retainer placed over the piston body, in which a plurality of connection holes corresponding to the compression passages penetrate the compression retainer; and a rebound retainer placed under the piston body, in which a plurality of connection holes corresponding to the rebound passages penetrate the rebound retainer.

A lower end of the compression passage may be an inlet, and an upper end of the rebound passage may be an inlet. A cross-sectional area of the inlets of the compression passage and the rebound passage may be larger than a cross-sectional area of outlets of the compression passage and the rebound passage.

The compression passage and the rebound passage may always maintain an open state.

The compression retainer may include: a first disk sheet protruding along an outside of the connection hole of the compression retainer in a concentric shape around the piston rod, an edge of a first compression disk being placed on the first disk sheet; and a second disk sheet protruding from an edge of the compression retainer along an outside of the first disk sheet, an edge of a second compression disk being placed on the second disk sheet.

A distance from the compression retainer to an edge of the second disk sheet may be greater than a distance from the compression retainer to an edge of the first disk sheet.

The rebound retainer may include: a third disk sheet protruding along an outside of the connection hole of the rebound retainer in a concentric shape around the piston rod, an edge of a first rebound disk being placed on the third disk sheet; and a fourth disk sheet protruding from an edge of the rebound retainer along an outside of the third disk sheet, an edge of a second rebound disk being placed on the fourth disk sheet.

A distance from the rebound retainer to an edge of the fourth disk sheet may be greater than a distance from the rebound retainer to an edge of the third disk sheet.

The compression retainer may include a protrusion which is inserted into an inlet of at least one rebound passage among the plurality of rebound passages.

A cross-sectional area of the protrusion may be smaller than a cross-sectional area of the inlet of the rebound passage.

The rebound retainer may include a protrusion which is inserted into an inlet of at least one compression passage among the plurality of compression passages.

A cross-sectional area of the protrusion may be smaller than a cross-sectional area of the inlet of the compression passage.

<Description of Reference Numerals>

Figure 1:
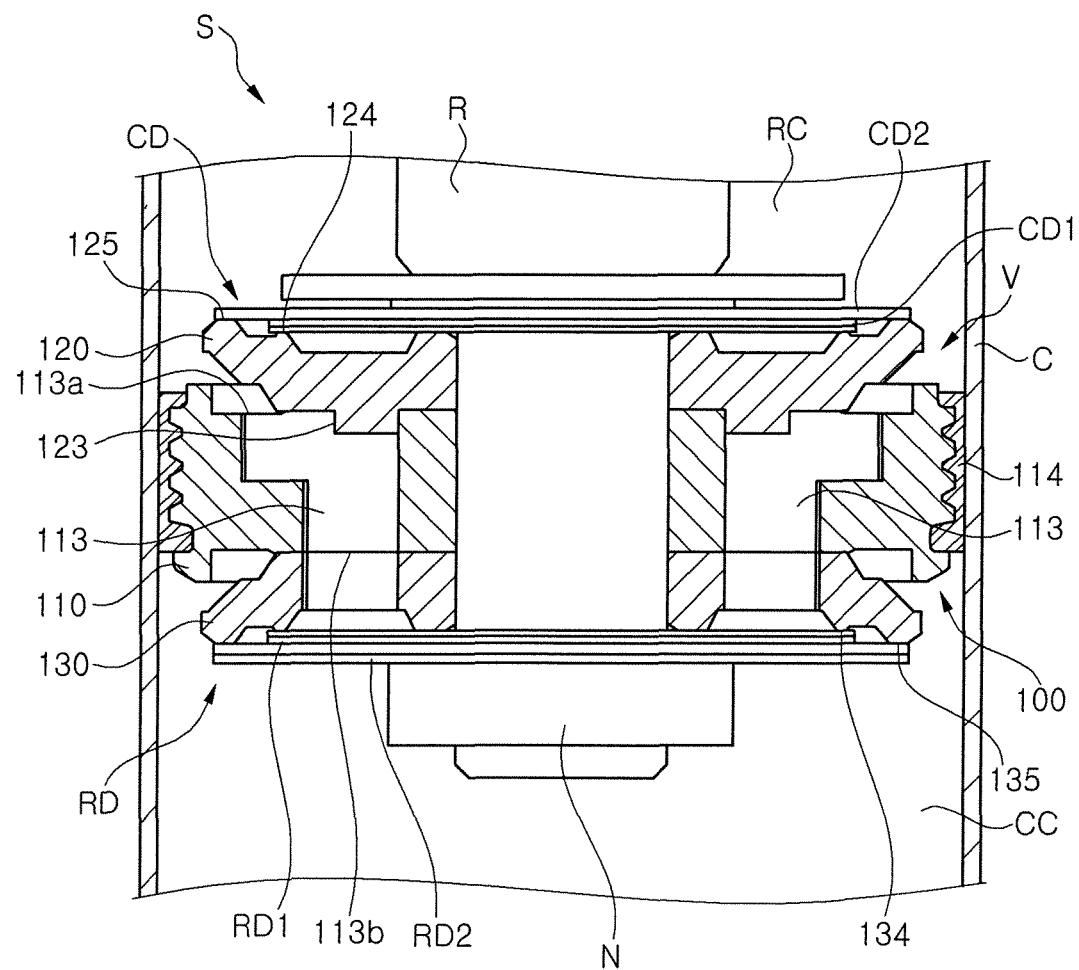
FIG. 1 is a longitudinal sectional view of a shock absorber including a piston assembly according to an embodiment of the present invention.

| | |
|---|---|
| 100: piston assembly | 110: piston body |
| 112: compression passage | 113: rebound passage |
| 120: compression retainer | 122: connection hole |
| 130: rebound retainer | 132: connection hole |

DETAILED DESCRIPTION OF EXEMPLARY EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout this disclosure.

FIG. 1 is a longitudinal sectional view of a shock absorber including a piston assembly according to an embodiment of the present invention. Referring to FIG. 1, the shock absorber S includes a cylinder C, a piston rod R, and a piston valve V.

The cylinder C is connected to a wheel (not shown) and is filled with a working fluid, that is, oil. One end of the piston rod R is inserted into the inside of the cylinder C, and the other end of the piston rod R extends toward the outside of the cylinder C and is connected to a vehicle body (not shown).

The piston valve V reciprocates within the cylinder C to generate a damping force. The piston valve V includes a piston assembly 100, a plurality of compression disks CD, and a plurality of rebound disks RD. The plurality of compression disks CD are disposed at a rebound chamber (RC) side with respect to the piston assembly 100, and are placed in the piston assembly 100. The plurality of rebound disks RD are disposed at a compression chamber (CC) side with respect to the piston assembly 100, and are placed in the piston assembly 100.

Figure 2:
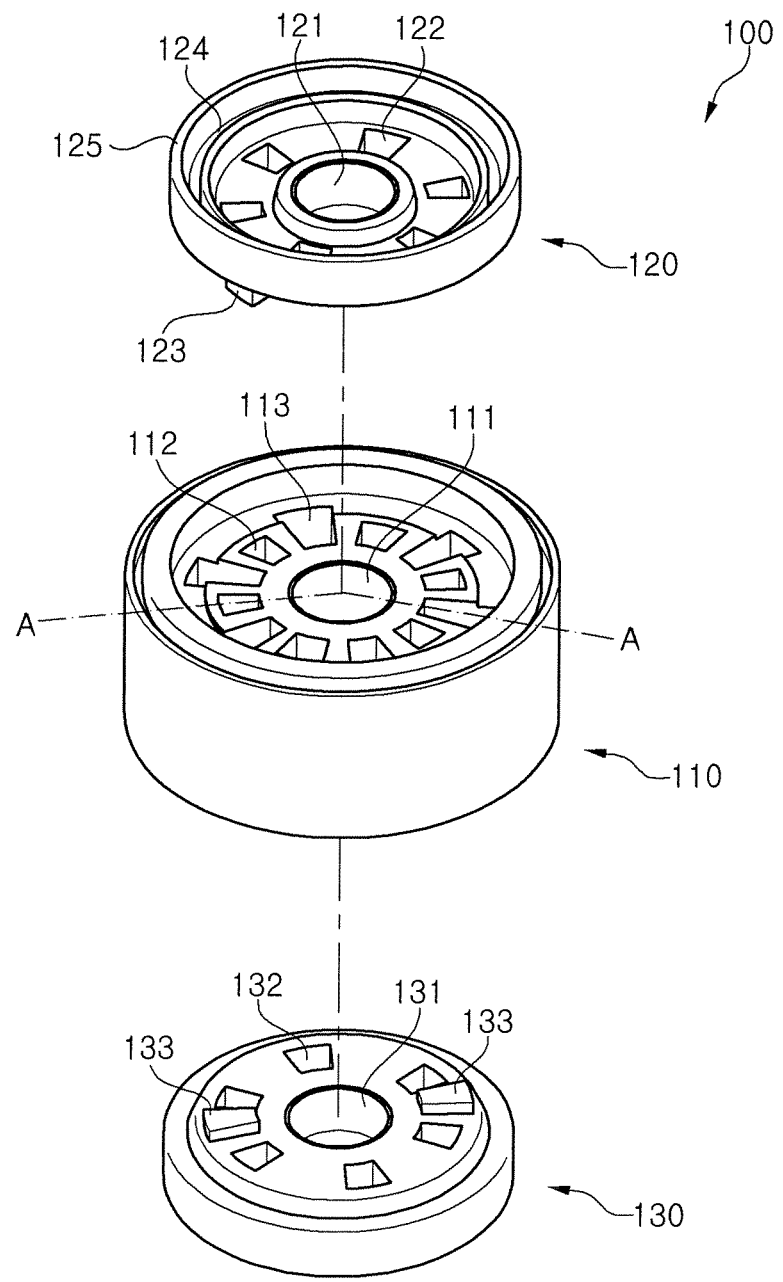
FIG. 2 is an exploded perspective view of the piston assembly shown in FIG. 1.
Figure 3:
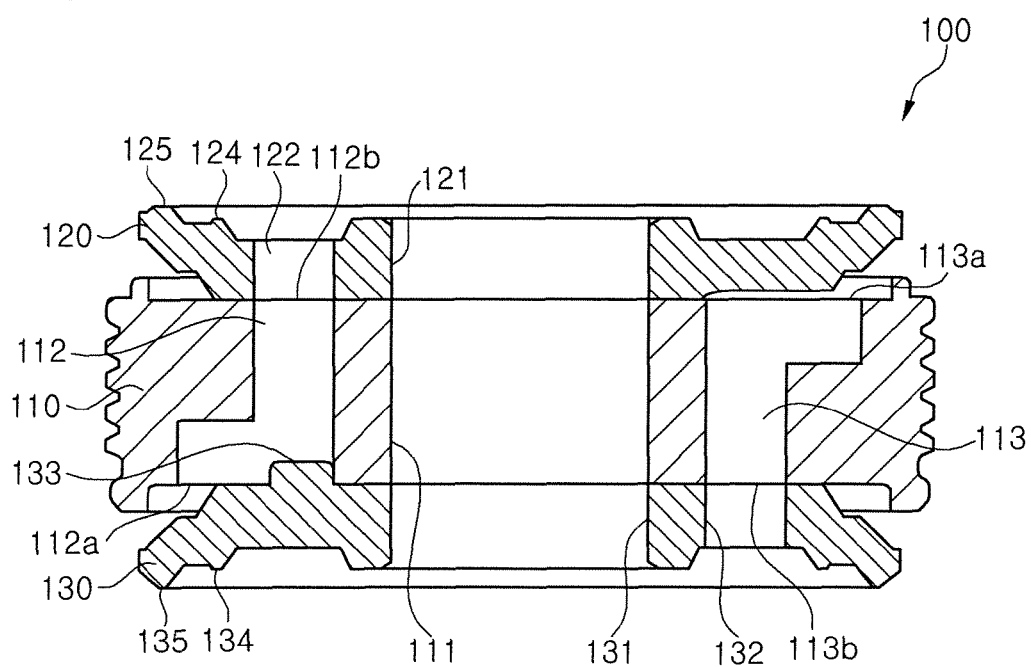
FIG. 3 is a longitudinal sectional view of the piston assembly, taken along line A-A of FIG. 2.

FIG. 2 is an exploded perspective view of the piston assembly shown in FIG. 1, and FIG. 3 is a longitudinal sectional view of the piston assembly, taken along line A-A of FIG. 2.

Referring to FIGS. 1 to 3, the piston assembly 100 includes a piston body 110, a compression retainer 120, and a rebound retainer 130.

The piston body 110 includes a through-hole 111, a plurality of compression passages 112, and a plurality of rebound passages 113. The through-hole 111 penetrates a central portion of the piston body 110, and the piston rod R is inserted into the through-hole 111. The plurality of compression passages 112 and the plurality of rebound passages 113 are alternately arranged around the through-hole 111.

A Teflon banding may be performed on the outer peripheral surface of the piston body 110 in order to reduce a frictional force on the inner surface of the cylinder C and improve a smooth reciprocating motion.

Each of the compression passages 112 includes an inlet 112a formed at the compression chamber (CC) side, and an outlet 112b formed at the rebound chamber (RC) side. A cross-sectional area of the inlet 112a is larger than a cross-sectional area of the outlet 112b. The plurality of compression passages 112 and the plurality of rebound passages 113 penetrate the piston body 110 in a longitudinal direction.

Each of the rebound passages 113 includes an inlet 113a formed at the rebound chamber (RC) side, and an outlet 113b formed at the compression chamber (CC) side. A cross-sectional area of the inlet 113a is larger than a cross-sectional area of the outlet 113b.

The compression retainer 120 is placed over the piston body 110, and a plurality of connection holes 122 corresponding to the compression passages 112 penetrate the compression retainer 120.

Specifically, the compression retainer 120 includes a through-hole 121 and the plurality of connection holes 122. The through-hole 121 penetrates a central portion of the compression retainer 120, and the piston rod R is inserted into the through-hole 121. The plurality of connection holes 122 are arranged around the through-hole 121 at positions corresponding to the compression passages 112 of the piston body 110.

That is, the compression retainer 120 is placed at an end portion of the rebound chamber (RC) side of the piston body 110, such that the plurality of connection holes 122 are connected to the outlets 112b of the compression passages 112 of the piston body 110.

The surface of the compression retainer 120, which comes into contact with the piston body 110, is formed such that the inlets 113a of the rebound passage 113 formed in the piston body 110 are opened.

Furthermore, the surface of the compression retainer 120, which comes into contact with the piston body 110, is provided with two protrusions 123 inserted into the inlet 113a of at least one rebound passage 113 among the plurality of rebound passages 113 formed in the piston body 110.

The two protrusions 123 are arranged to be mutually symmetric and are inserted into the inlets 113a of the rebound passages 113 to prevent a relative rotation with respect to the piston body 110.

In the compression retainer 120, a first disk sheet 124 and a second disk sheet 125 are formed on the opposite side to the piston body 110. The first disk sheet 124 is disposed at the outside of the connection hole 122 and has a protruding circular shape. The second disk sheet 125 is disposed at the outside of the first disk sheet 124 and has a protruding circular shape.

A diameter of the second disk sheet 125 is greater than a diameter of the first disk sheet 124. A height of the second disk sheet 125 protruding from the compression retainer 120 is greater than a height of the first disk sheet 124.

The rebound retainer 130 is placed under the piston body 110, and a plurality of connection holes 132 corresponding to the rebound passages 113 penetrate the rebound retainer 130.

Specifically, the rebound retainer 130 has the same shape as the above-described compression retainer 120. The rebound retainer 130 includes a through-hole 131 and the plurality of connection holes 132. The through-hole 131 penetrates the central portion of the rebound retainer 130 and is connected to the piston rod R. The plurality of connection holes 132 are arranged around the through-hole 131 at positions corresponding to the rebound passages 113 of the piston body 110.

That is, the rebound retainer 130 is placed at an end portion of the compression chamber (CC) side of the piston body 110, and the plurality of connection holes 132 are connected to the outlets 113b of the rebound passages 113 of the piston body 110.

The surface of the rebound retainer 130, which comes into contact with the piston body 110, is formed such that the inlets 112a of the rebound passage 112 formed in the piston body 110 are opened.

Furthermore, the surface of the rebound retainer 130, which comes into contact with the piston body 110, is provided with two protrusions 133 inserted into the inlet 112a of at least one compression passage 112 among the plurality of compression passages 112 formed in the piston body 110.

The two protrusions 133 are arranged to be mutually symmetric and are inserted into the inlets 112a of the compression passages 112 to prevent a relative rotation with respect to the piston body 110.

In the rebound retainer 130, a third disk sheet 134 and a fourth disk sheet 135 are formed on the opposite side to the piston body 110. The third disk sheet 134 is disposed at the outside of the connection hole 132 and has a protruding circular shape. The fourth disk sheet 135 is disposed at the outside of the third disk sheet 134 and has a protruding circular shape.

A diameter of the fourth disk sheet 135 is greater than a diameter of the third disk sheet 134. A height of the fourth disk sheet 135 protruding from the rebound retainer 130 is greater than a height of the third disk sheet 134.

A plurality of compression disks CD are laminated. The plurality of compression disks CD include at least one first compression disk CD1 and a second compression disk CD2. An edge of the at least one first compression disk CD1 is placed on the first disk sheet 124. An edge of the second compression disk CD2 is placed on the second disk sheet 125, and a radius of the second compression disk CD2 is greater than a radius of the first compression disk CD1.

The plurality of compression disks CD are deformed during a compression stroke, so that the working fluid moves to the rebound chamber RC through the compression passage 112.

A plurality of rebound disks RD are laminated. The plurality of rebound disks RD include at least one first rebound disk RD1 and a second rebound disk RD2. An edge of the at least one rebound disk RD1 is placed on the third disk sheet 134. An edge of the fourth compression disk RD2 is placed on the fourth disk sheet 135, and a radius of the second rebound disk RD2 is greater than a radius of the first rebound disk RD1.

The plurality of rebound disks RD are deformed during a rebound stroke, so that the working fluid moves to the compression chamber CC through the rebound passage 113.

The present invention may achieve the above-described object.

Specifically, the piston assembly of the shock absorber is configured such that the compression retainer and the rebound retainer are connected to both ends of the piston body including the plurality of compression passages and the plurality of rebound passage alternately arranged along the circumferential direction. Therefore, the piston assembly of the shock absorber is simple in structure and is easy to fabricate.

Moreover, the compression retainer and the rebound retainer are provided with the protrusions that are inserted into the inlets of the compression passages and the inlets of the rebound passages, which are formed in the piston body. Therefore, the protrusions may prevent the relative rotation of the compression retainer and the rebound retainer with respect to the piston body, contributing to the improvement of assemblability.

While the embodiments of the present invention has been described with reference to the specific embodiments, it will be apparent to those skilled in the art that various changes and modifications may be made without departing from the spirit and scope of the invention as defined in the following claims.

What is claimed is:

1. A piston assembly of a shock absorber, comprising:
    a piston body penetrated at a central portion thereof by a piston rod which reciprocates within a cylinder of the shock absorber, and a plurality of compression passages and a plurality of rebound passages alternately penetrating the piston body are formed around the piston rod;
    a compression retainer placed over the piston body, in which a plurality of connection holes corresponding to the compression passages penetrate the compression retainer; and
    a rebound retainer placed under the piston body, in which a plurality of connection holes corresponding to the rebound passages penetrate the rebound retainer, wherein
    a lower end of a compression passage is an inlet;
    an upper end of a rebound passage is an inlet; and
    cross-sectional areas of the inlets of the compression passage and the rebound passage are larger than cross-sectional areas of outlets of the compression passage and the rebound passage,
    wherein the compression retainer comprises a step-shaped protrusion squared out therefrom, which is inserted into an inlet of at least one rebound passage among the plurality of rebound passages.

2. The piston assembly according to claim 1, wherein the compression passage and the rebound passage always maintain an open state.

3. The piston assembly according to claim 1, wherein the compression retainer comprises:
    a first disk sheet protruding along an outside of the connection hole of the compression retainer in a concentric shape around the piston rod, an edge of a first compression disk being placed on the first disk sheet; and
    a second disk sheet protruding from an edge of the compression retainer along an outside of the first disk sheet, an edge of a second compression disk being placed on the second disk sheet.

4. The piston assembly according to claim 3, wherein a height of the second disk sheet protruding axially from the edge of the compression retainer is greater than a height of the first disk sheet protruding axially.

5. The piston assembly according to claim 1, wherein the rebound retainer comprises:
    a third disk sheet protruding along an outside of the connection hole of the rebound retainer in a concentric shape around the piston rod, an edge of a first rebound disk being placed on the third disk sheet; and
    a fourth disk sheet protruding from an edge of the rebound retainer along an outside of the third disk sheet, an edge of a second rebound disk being placed on the fourth disk sheet.

6. The piston assembly according to claim 5, wherein a height of the fourth disk sheet protruding axially from the edge of the rebound retainer is greater than a height of the third disk sheet protruding axially.

7. The piston assembly according to claim 1, wherein a cross-sectional area of the protrusion is smaller than a cross-sectional area of the inlet of the rebound passage.

8. The piston assembly according to claim 1, wherein the rebound retainer comprises a step-shaped protrusion squared out therefrom, which is inserted into an inlet of at least one compression passage among the plurality of compression passages.

9. The piston assembly according to claim 8, wherein a cross-sectional area of the protrusion is smaller than a cross-sectional area of the inlet of the compression passage.

* * * * *